United States Patent Office 2,914,356
Patented Nov. 24, 1959

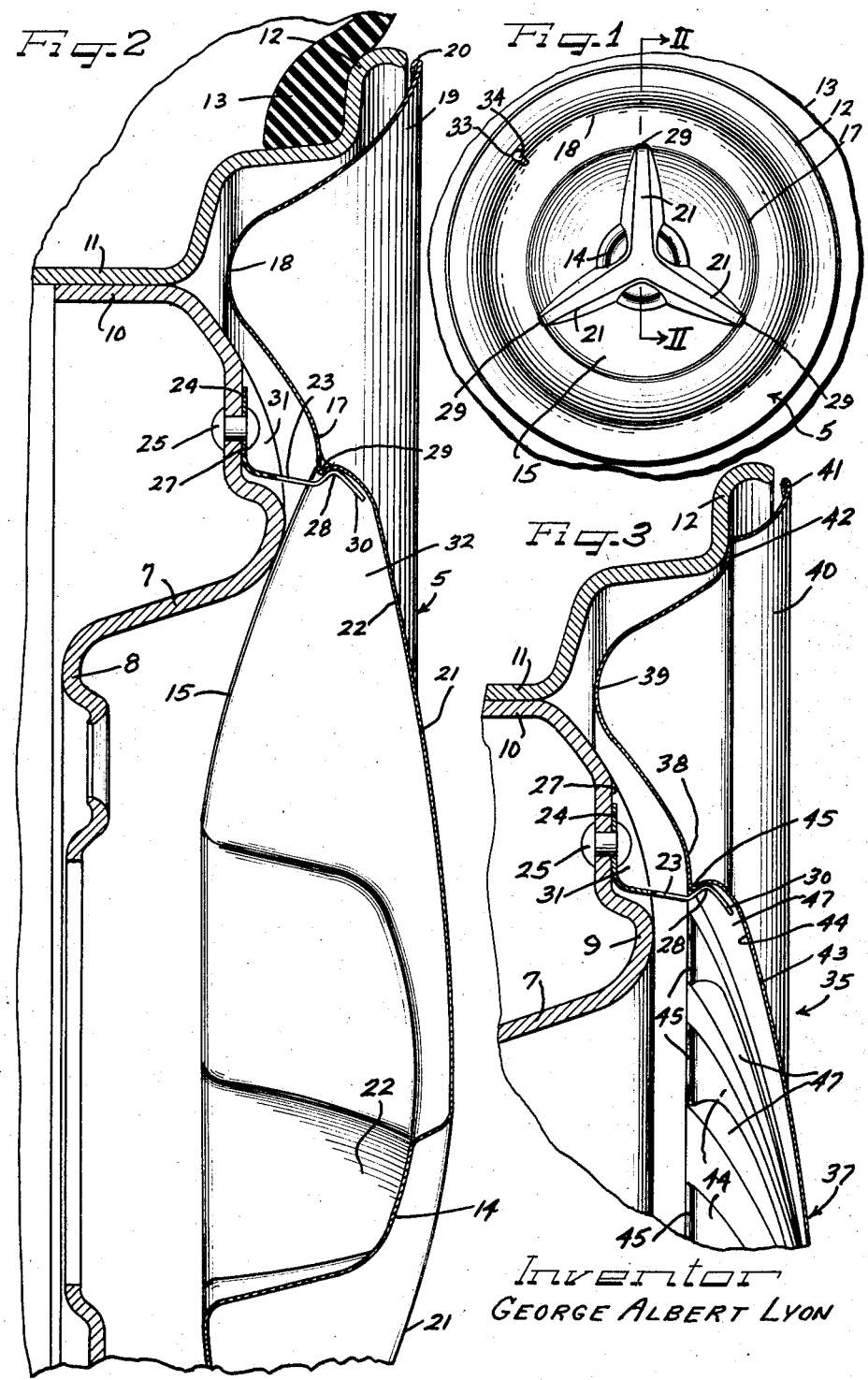

2,914,356

WHEEL COVER

George Albert Lyon, Detroit, Mich.

Application February 17, 1956, Serial No. 566,230

6 Claims. (Cl. 301—37)

The present invention relates to improvements in wheel structures and more particularly concerns the ornamental and protective covering of the outer sides of vehicle wheels.

An important object of the present invention is to provide an improved wheel structure having novel cover means for disposition at the outer side thereof.

Another object of the invention is to provide an improved wheel structure having a cover for disposition thereover and novel means for retaining the cover on the wheel.

A further object of the invention is to provide an improved wheel cover structure and means for retaining the cover on the wheel, affording substantial economies in fabrication costs, by virtue of simplicity of construction of the cover while nevertheless affording a wide range of ornamental design variety and choice.

Still another object of the invention is to provide a novel wheel cover structure wherein a portion of the ornamental configuration affords facility for engagement with cover retaining means on the wheel.

Other objects, features and advantages of the present invention will be readily apparent from the following detailed description of certain preferred embodiments thereof taken in conjunction with the accompanying drawing, in which:

Figure 1 is an outer side elevational view of a wheel structure embodying features of the invention;

Figure 2 is a substantially enlarged fragmentary generally diametrical sectional view taken substantially on the line II—II of Figure 1; and Figure 3 is a fragmentary sectional detail view similar to Figure 2 but showing a modification.

As shown in Figures 1 and 2, a wheel cover 5 is constructed and arranged to be applied to the outer side of a vehicle wheel such as an automobile wheel including a wheel body 7 of the disk spider type provided with a central dished bolt on flange 8 surrounded by an annular generally axially outwardly projecting nose bulge 9 leading at the outer side to a generally axially inwardly extending marginal attachment flange 10 secured in suitable manner to a base flange 11 of a multi-flange, drop center tire rim provided at its axially outer side with a terminal flange 12 and adapted to support a pneumatic tire 13.

In a preferred form, the wheel cover 5 comprises a one-piece sheet metal disk stamped or drawn to shape and of a diameter to substantially cover the wheel body 7 and the tire rim. To this end, the cover 5 comprises a body made from suitable gauge of sheet metal stock such as stainless steel, brass, aluminum or the like susceptible of mass production by stamping or drawing and adapted for the desired finish such as polish and plated or other desirable type of decorative surface treatment.

Centrally the wheel cover 5 is provided with an axially outwardly bulged and axially inward chambered crown portion 14 which is adapted to accommodate therein the projecting portion of a vehicle axle hub that may project through the bolt on flange 8 of the wheel body. About the relatively small diameter crown portion 14 is a circular dished cover portion 15 which is adapted to extend into overlying relation to the nose bulge 9 of the wheel body and in the present instance is adapted to rest thereagainst to define the axially inward disposition of the cover on the wheel. About the dished central cover portion 15 and joined thereto on an annular nose bulge-overlying rib-like juncture portion 17 is an annular axially inwardly dished radially outer cover portion 18 which is dimensioned to extend into the substantial annular axially outwardly opening groove defined between the nose bulge 9 of the wheel body and the outer side flanges of the tire rim. An outer circular marginal portion 19 of the cover is dimensioned to overly the tire rim terminal flange 12 and has an underturned reinforcing and finishing bead-like flange 20.

According to the present invention, the cover 5 is provided with ornamental and reinforcing generally radial rib structure on the central portions thereof which serve also to accommodate cover retaining means on the wheel. Where a substantially sporty appearance is desired for the cover, more or less simulating a "knock-off" central handle arrangement such as used on some sport car covers, or a sort of airplane propeller simulating arrangement, the central crown portion 14 and dished portion 15 of the cover may be provided with axially outwardly embossed integral generally radially extending and symmetrically spaced arm-like ribs 21, in the present instance three in number, although this number may be varied if desired. The spoke arm reinforcing ribs 21 may emanate from a common central juncture on the crown 14 and extend across the dished portion 15 to and merge at their radially outer ends with the annular intermediate juncture rib 17. It will be appreciated that such an arrangement of the ribs 21 and the relationship thereof to the annular rigidifying rib 17 affords a substantially rigid central structure for the cover highly resistant to curbing or other damage.

At the inner side of the cover, the ribs 21 afford substantial axially inwardly opening respective chambers 22 running out at the radially outer ends of the ribs where the ribs 21 and the dished portion 15 of the cover join the annular juncture reinforcing rib 17. Since such juncture is of substantial rigidity and is located reasonably close to the adjacent portion of the wheel body and more particularly the nose bulge 9, it is herein conveniently utilized for cover retaining interengagement with cover retaining means projecting from the nose bulge 9 and herein in the form of resilient spring clips 23.

Each of the spring clips 23 comprises a generally axially outwardly extending resilient spring leg that has a generally radially extending base flange 24 secured as by means of a rivet 25 within a suitable depression 27 in the nose bulge 9. At its axially outer end portion the clip 23 has a generally radially outwardly bulging terminal lug bend or head structure 28 which is resiliently interlockingly engageable with a generally radially inwardly indented retaining shoulder formation 29 at the tip juncture of one of the ribs 21 with the annular cover rib 17. As observed in Figure 2, the interlock head 28 of the clip is accommodated within the radially outer end portion of the chamber 22 within the cover rib 21 and which is of sufficient area axially outwardly adjacent to the indented or inset shoulder 29 to accommodate the clip head and more especially a generally radially inwardly and axially outwardly oblique camming terminal flange 30 thereof. There are, of course, preferably an equal number of the clips 23 to the number of the cover ribs 21.

In applying the cover 5 to the outer side of the wheel, the radially outer ends of the radial cover ribs 21 are registered with the retaining clips 23 and with the clip engageable shoulders 29 bearing against the camming flanges 30 of the clips, since normally the clip retaining shoulders 28 extend to a diameter which is somewhat greater than the diameter described about the cover shoulders 29. Then as the cover is pressed axially inwardly, the retaining clips 23 are placed under resilient radially inwardly deflected tension by the radially inward camming of the heads of the clips by the rigid cover shoulders 29, until the heads 28 of the clips snap retainingly over the cover shoulders 29. The length of the clips 23 is so related to the seated disposition of the cover on the wheel that the tensioned grip of the clip head shoulders 28 on the axially outer sides of the retaining shoulders 29 of the cover effects a generally axially inward tension drawing of the cover to seat firmly against the nose bulge 9.

It will be observed that inasmuch as the retaining clips 23 are seated within the depressions 27 in the wheel body and which depressions are defined at the opposite sides thereof with generally circumferentially facing walls or shoulders 31, the clips are held against any substantial displacement in a circumferential direction relative to the cover. At the same time, since the head portions of the clips 23 are received within the chambers 22 of the cover ribs and thus between the radially outer end portions of respective opposite and generally circumferentially facing side walls 32 defining the rib chambers 22, the cover is not only held against turning on the wheel by the clip heads but is also held against relative rotary or torque movement with respect to the clips. Since the extent of the resilient clip legs that is free between the clip recess wall shoulders 31 and the chamber recess walls 32 is quite short twisting deflection of the clip bodies or legs in response to even strong torque forces is substantially precluded. This is of substantial advantage in preventing misalignment or rotary or torque shifting of a valve stem aperture 33 in the dished cover portion 18 with respect to a valve stem 34 projecting from the tire rim and through such aperture.

In the modification of Figure 3, a wheel cover 35 is constructed and arranged to be applied to the outer side of a vehicle wheel which may in all essential respects be substantially the same as the wheel of Figure 2 and therefore bears the same reference numerals to identify like parts, inclusive of the cover retaining fingers 23. In this instance, however, the cover 35 has a central crown portion 37 which in general is of a diameter to extend in overlying relation to the central portion of the wheel body 7 and to an annular juncture rib portion 38 which is arranged to overly the nose bulge of the wheel body at the radially inner side of an annular axially inwardly dished portion 39 of the cover. Radially outwardly of the dished portion 39 the cover extends generally radially and axially outwardly to a marginal extremity portion 40 which has an underturned reinforcing and finishing bead-like flange 41 for disposition in spaced relation to the tip of the terminal flange 12. At a suitably radially inwardly spaced portion thereof, the marginal portion 40 of the cover has an indented annular reinforcing and seating rib 42 which is adapted to bottom against the radially inner portion of the terminal flange 12 for thereby defining the axially inward disposition of the cover on the wheel.

For retention of the cover 35 on the wheel, means are provided adjacent juncture of the central crown portion 37 of the cover with the rib portion 38 for retaining interengagement with the retaining clips 23. To this end, the central portion of the cover is provided with embossments 43 preferably in the form of a series of generally radially extending and axially outwardly projecting ornamental and reinforcing ribs 43 providing therein generally axially inwardly opening chambers 44 within the radially outer portions of which the clip heads 28 are received in assembly. At the radially outer extremities of the chambers 44, or at least certain of them respective generally radially inwardly projecting, turned or indented shoulders 45 are provided. Such shoulders 45 are on a diameter which is less than the normal diameter described about the clip shoulder heads 28 and so related thereto that by pressing the cover axially inwardly to cause the clip head flanges 30 to cam generally radially inwardly as permitted by resilient flexure of the main body or leg portions of the clips 23, the clip head shoulders 28 will cam inwardly and then snap over the retaining shoulder ribs 45. More particularly, the clip heads 28 engage within the generally radially inwardly opening recesses or grooves that are provided at the radially outer extremities of the chambers 44 at the axially outer sides of the shoulders 45, similarly as provided by the shoulders 29 in Figure 2.

Also similarly as in Figure 2, the sides 31 of the clip receiving recesses in the wheel body and side walls 47 defining the chambers 44 cooperate with the retaining clips 23 to retain the cover against turning so as to avoid torsional displacement of the cover relative to a valve stem (not shown) that may project through the cover portion 39.

For removing the cover 35 from the wheel, a pry-off tool may be inserted between the tire rim terminal flange 12 and the outer extremity beaded edge 41 of the cover and then levered to initiate dislodgment of the cover from the clips 23 and finally levered between the seating shoulder 42 and the tire rim to complete the pry-off.

In both forms of the cover shown, the cover rests on only one of the wheel parts, in Figure 2 the cover 5 resting on the wheel body and in Figure 3 the cover 35 resting on the tire rim, so that ample tolerance is afforded for the manufacturing tolerance variation in axial placement of the tire rim and the wheel body.

It will be understood that modifications and variations may be effected without departing from the scope of the novel concepts of the present invention.

I claim as my invention:

1. In a wheel structure including a tire rim carrying a valve stem and a wheel body having thereon an annular series of circumferentially spaced generally axially outwardly extending resilient spring cover retaining clips with shouldered heads thereon, a cover for disposition at the outer side of the wheel having a central portion provided with a series of radially extending and axially outwardly projecting ornamental and reinforcing ribs providing generally axially inwardly opening chambers receptive of the shoulder heads of the clips, the cover having a valve stem opening through which the valve stem projects, and retaining shoulders in said chambers engageable in snap-on pry-off cover retaining relation with the shoulder heads of the clips, said chambers having generally circumferentially facing surfaces therein opposing the clip heads for holding the cover against turning on the wheel and thereby maintaining alignment of the valve stem and the valve stem opening.

2. In a wheel structure including a tire rim and a wheel body having thereon an annular series of circumferentially spaced generally axially outwardly extending resilient spring cover retaining clips with shouldered heads thereon, a cover for disposition at the outer side of the wheel having a central portion provided with an annular reinforcing rib formation, a series of radially extending and axially outwardly embossed ornamental and reinforcing ribs having ends joining said reinforcing rib and providing generally axially inwardly opening chambers receptive of the shoulder heads of the clips, and retaining shoulders in said chambers engageable in snap-on pry-off cover retaining relation with the shoulder heads of the clips, said cover shoulders comprising inturned indentations in the cover at juncture of said ribs and said annular reinforcing rib formation whereby to afford a substantially rigid structure engageable with the retaining clips.

3. In a wheel structure including a tire rim and a wheel body having thereon an annular series of circumferentially spaced generally axially outwardly extending resilient spring cover retaining clips with shouldered heads thereon, a cover for disposition at the outer side of the wheel having a central portion provided with a series of radially extending and axially outwardly embossed ornamental and reinforcing ribs providing generally axially inwardly opening chambers receptive of the shoulder heads of the clips, and retaining shoulders in said chambers engageable in snap-on pry-off cover retaining relation with the shoulder heads of the clips, said chambers in the cover being defined at their circumferential sides by wall surfaces interengageable with the clip heads to hold the cover against turning on the wheel.

4. In a wheel structure including a tire rim and a wheel body having thereon an annular series of circumferentially spaced generally axially outwardly extending resilient spring cover retaining clips with shouldered heads thereon, a cover for disposition at the outer side of the wheel having a central portion provided with a series of radially extending and axially outwardly embossed ornamental and reinforcing ribs providing generally axially inwardly opening chambers receptive of the shoulder heads of the clips, and retaining shoulders in said chambers engageable in snap-on pry-off cover retaining relation with the shoulder heads of the clips, said wheel body and said chambers providing respective spaced circumferentially facing shoulders engageable with the clips to retain the clips against twisting out of position and also for retaining the cover against rotary displacement relative to the wheel.

5. In a wheel structure including a tire rim and a wheel body having thereon an annular series of circumferentially spaced generally axially outwardly extending resilient spring cover retaining clips with shouldered heads thereon, a cover for disposition at the outer side of the wheel having a radially outer portion for seating on the tire rim and thereby maintaining the cover spaced from the wheel body, the cover having a central portion provided with a series of radially extending and axially outwardly embossed ornamental and reinforcing ribs providing generally axially inwardly opening chambers receptive of the shoulder heads of the clips, and retaining shoulders in said chambers engageable in snap-on pry-off cover retaining relation with the shoulder heads of the clips, said clip heads interengaging with the cover shoulders to draw the cover axially inwardly and thereby holding the radially outer cover portion in seating engagement with the tire rim.

6. In a wheel structure including a tire rim and a wheel body supporting the same, the wheel body having a circumferentially spaced series of cover retaining elements thereon providing generally axially inwardly facing cover retaining shoulders, a cover for disposition over the outer side of the wheel comprising a wheel body overlying part provided with a plurality of generally radially extending arm-like ribs defining respective generally axially inwardly opening chambers within which said retaining elements are received, said chambers having therein complementary shoulders engageable retainingly with the shoulders of the retaining elements in press-on, pry-off relation, and the arms coacting with the retaining elements within the chambers thereof to hold the cover against turning on the wheel.

References Cited in the file of this patent
UNITED STATES PATENTS

| | | |
|---|---|---|
| D. 175,885 | Grayell | Oct. 25, 1955 |
| 2,598,705 | Lyon | June 3, 1952 |
| 2,609,246 | Lyon | Sept. 2, 1952 |